(Model.)

C. A. CASE.
DRAWING PAD.

No. 435,395. Patented Sept. 2, 1890.

2 Sheets—Sheet 1.

Witnesses
Jno. G. Hinkel
W. S. McArthur

Inventor
Charles A. Case.
By his Attorneys
Foster & Freeman (Model.)

2 Sheets—Sheet 2.

C. A. CASE.
DRAWING PAD.

No. 435,395. Patented Sept. 2, 1890.

Witnesses
Jno. G. Hinkel.
W. S. McArthur

Inventor
Charles A. Case
By his Attorneys
Inter & Leeman

UNITED STATES PATENT OFFICE.

CHARLES A. CASE, OF NEW YORK, N. Y.

DRAWING-PAD.

SPECIFICATION forming part of Letters Patent No. 435,395, dated September 2, 1890.

Application filed March 3, 1890. Serial No. 342,352. (Model.)

*To all whom it may concern:*

Be it known that I, CHARLES A. CASE, a citizen of the United States, residing at New York, in the county and State of New York, have invented certain new and useful Improvements in Drawing-Pads, of which the following is a specification.

In making sketches and drawings from machines and devices of various kinds it is customary to make use of a drawing table or board having the sides at right angles to each other, and of a T-square, in order to facilitate the illustration of angular figures and insure the proper angles of the lines used in producing such illustration. While the use of these implements is not objectionable, but is a great convenience where the drawings are made deliberately and such accessories can properly be employed, the necessity of employing them is objectionable where off-hand sketches have to be made, often without preparation, or where proper appliances cannot be procured or made use of. In order to meet this emergency, I have devised the improved drafting-sheets which constitute my invention, and which are illustrated in the accompanying drawings.

Figure 1:
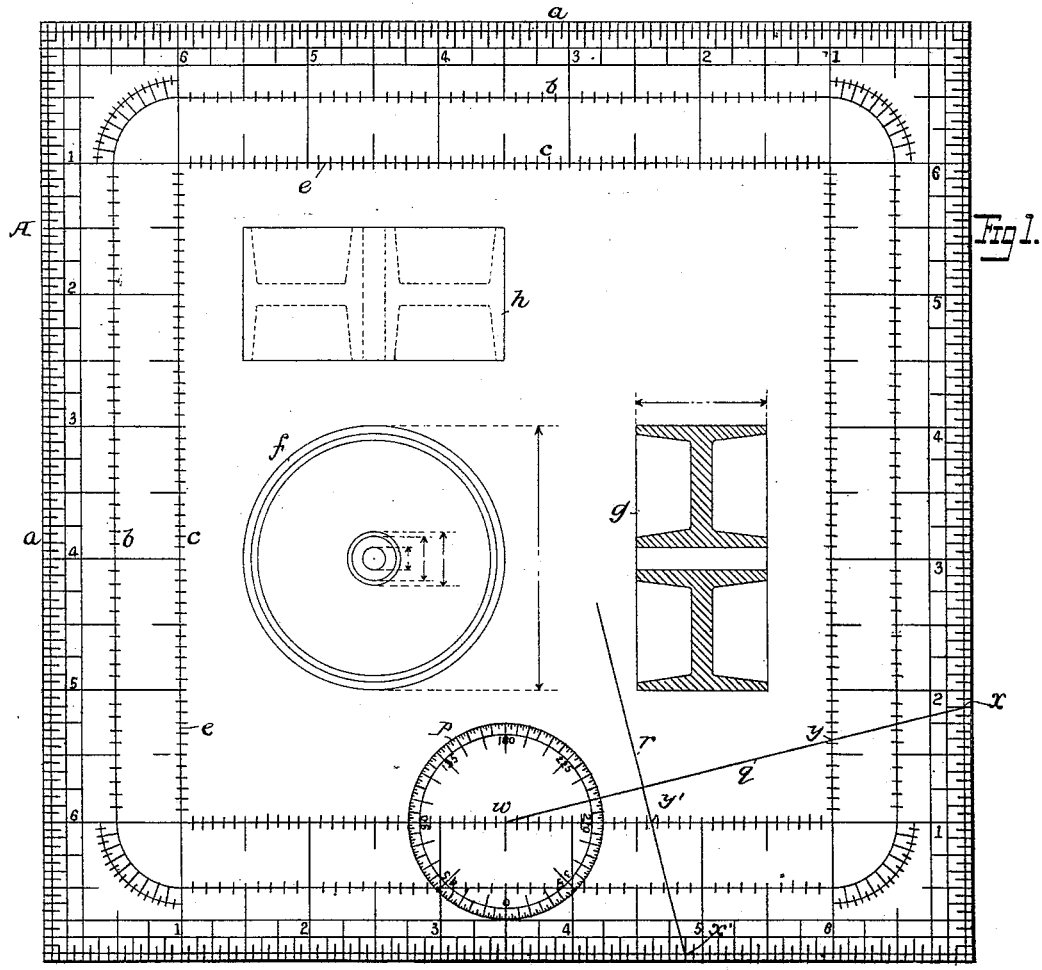
Figure 2:
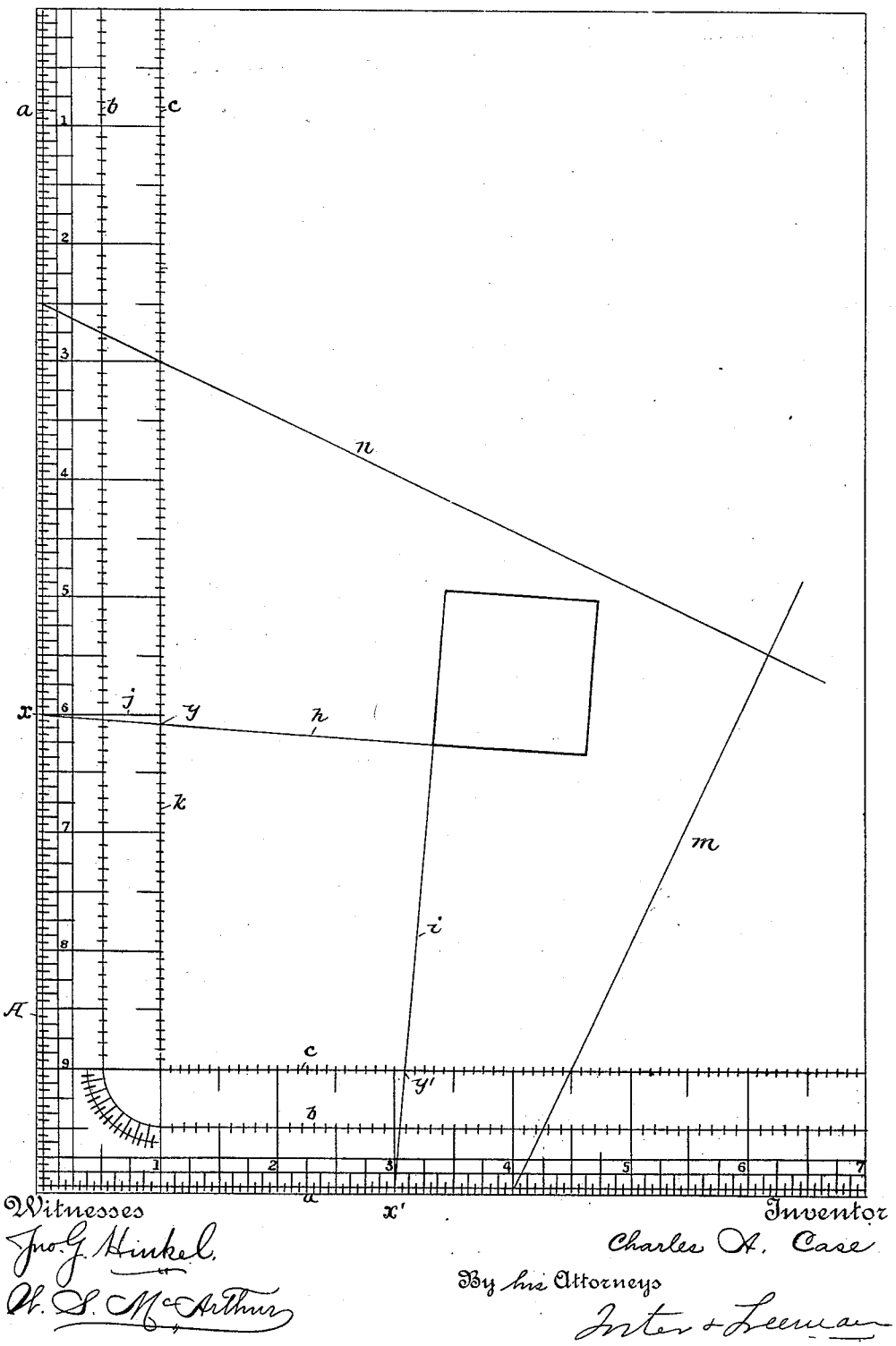

Figure 1 shows one form in which the sheet may be employed; and Fig. 2 illustrates another form, in which the marginal scales are placed upon but two sides of the sheet.

The sheet A is rectangular, oblong, as in Fig. 2, or square, as in Fig. 1, and upon each of two adjacent sides or upon each side is printed a scale, or two or more scales $a\ b\ c$, and each of which, when there is more than one, is divided into different degrees, as sixteenths in the outer scale $a$, tenths in the scale $b$, and twelfths in the scale $c$. The sheet thus described and shown may be used for facilitating accurate sketching in very many ways. Thus if a circle $f$ is drawn, as in Fig. 1, it may be projected to one side to illustrate the section $g$, or upward to illustrate the plan $h$, without any measurements whatever, and the sizes of the parts can be laid down according to any one of the scales, so that measurement of the sketches will indicate the actual sizes and proportions of the thing illustrated. If it is desired to put upon any portion of the sheet a square or oblong figure $a$, line $h$, Fig. 2, is drawn either at right angles or at any other angle to the side of the sheet, and then one or more lines at right angles to the first may be drawn at any point and with accuracy by placing the said lines $i$ at the same angle to the side scale as is the line $h$. Thus the line $h$ runs from a point $x$, at which the scale-line $j$ intersects the outer edge line of the scale, through the adjacent graduation $y$ of the inner line $k$ of the scale. A line $i$ at right angles to the line $h$ may therefore be drawn by placing a straight-edge to coincide with the points $x'\ y'$ of the scale upon the adjacent edge of the sheet. From these two lines any other lines may be drawn parallel to form the desired figure. The lines $m\ n$ are drawn at right angles to each other, but in a different position upon the paper, illustrating the same mode of securing the right-angle position of the lines.

To facilitate the laying off of definite angles less or greater than right angles, I prefer to indicate upon the sheet a complete circle $p$, the periphery of which is divided into degrees, and in order to make a line in any position upon the sheet I first draw a line $q$ from the center $w$ through the periphery of the circle at the angle required, and then by noting the points $y\ x$ on the right-hand scale and taking other similar points on the same scale I make a parallel line through them at the angle desired.

Instead of a complete circle $p$, a section of the circle may be printed on the sheet.

When the scale is at all of the edges of the sheet, as in Fig. 1, the measurements may be taken from one of the scales at one edge to the scale at the opposite edge, instead of from the outer line of one scale to the inner line of the same scale, as illustrated in Fig. 2.

It will be evident that with paper provided with scales, as above described, either in separate sheets or formed into pads, and by the use of only a straight-edge and a drawing-compass, it is practicable to make sketches to different scales and proportions and with extra accuracy.

Without limiting myself to the precise character of scale shown, I claim—

1. A combined drafting-sheet and scale, the middle portion of the sheet being blank, and the scale being printed upon one or more of its margins, substantially as described.

3. A combined drafting-sheet and scale, the middle portion of the sheet being blank and one or more of the margins provided with a series of scales, substantially as described.

In testimony whereof I have signed my name to this specification in the presence of two subscribing witnesses.

CHARLES A. CASE.

Witnesses:
W. CLARENCE DUVALL,
W. S. MCARTHUR.